(No Model.) 2 Sheets—Sheet 1.
M. F. WILLIAMS.
CLUTCH.
No. 441,998. Patented Dec. 2, 1890.
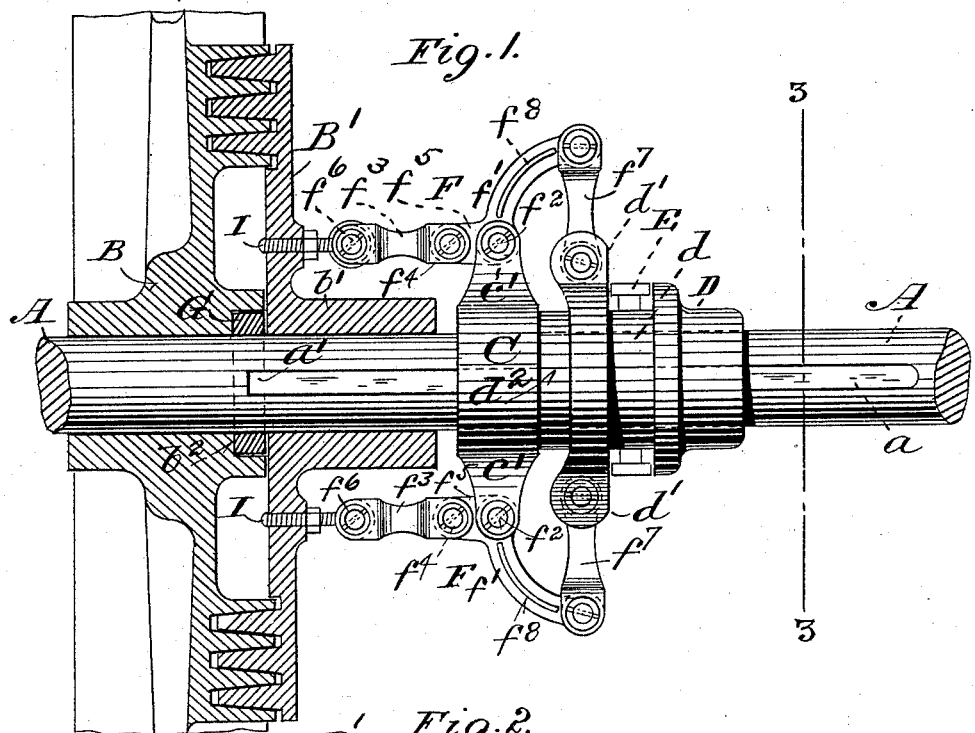
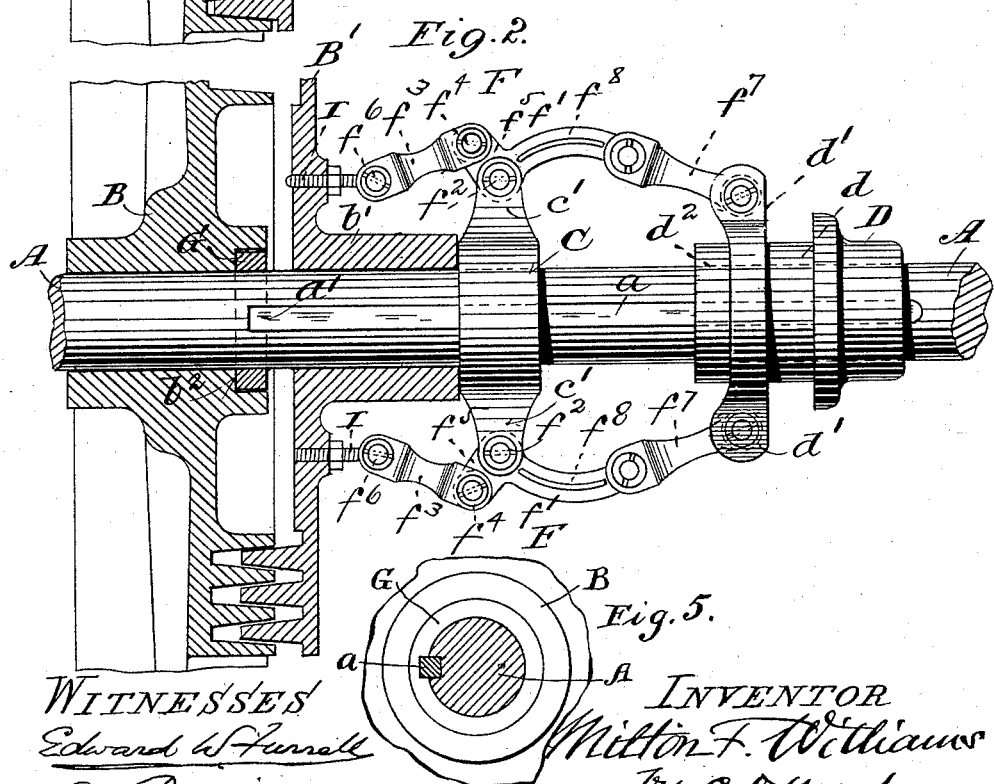
WITNESSES
Edward W. Furrell
A. Bonville.
INVENTOR
Milton F. Williams
by C. D. Moody
his atty (No Model.) 2 Sheets—Sheet 2.
M. F. WILLIAMS.
CLUTCH.
No. 441,998. Patented Dec. 2, 1890.
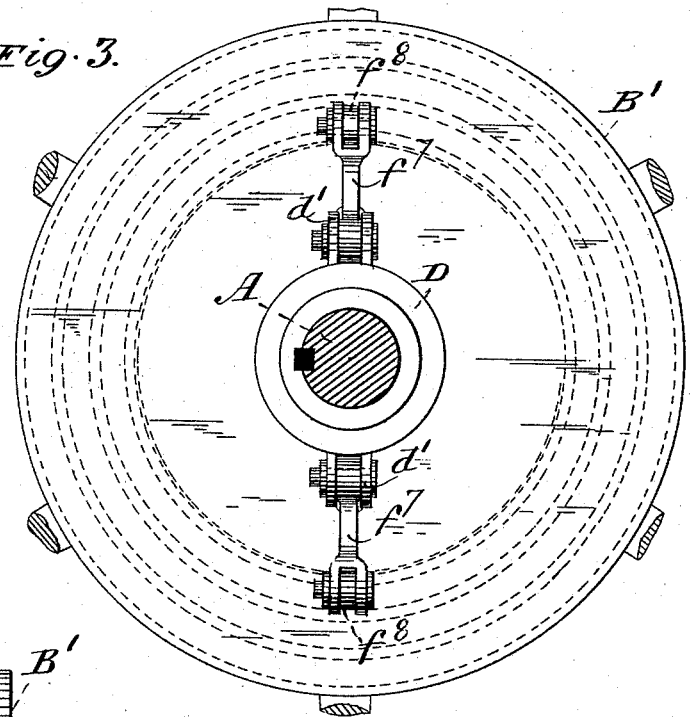
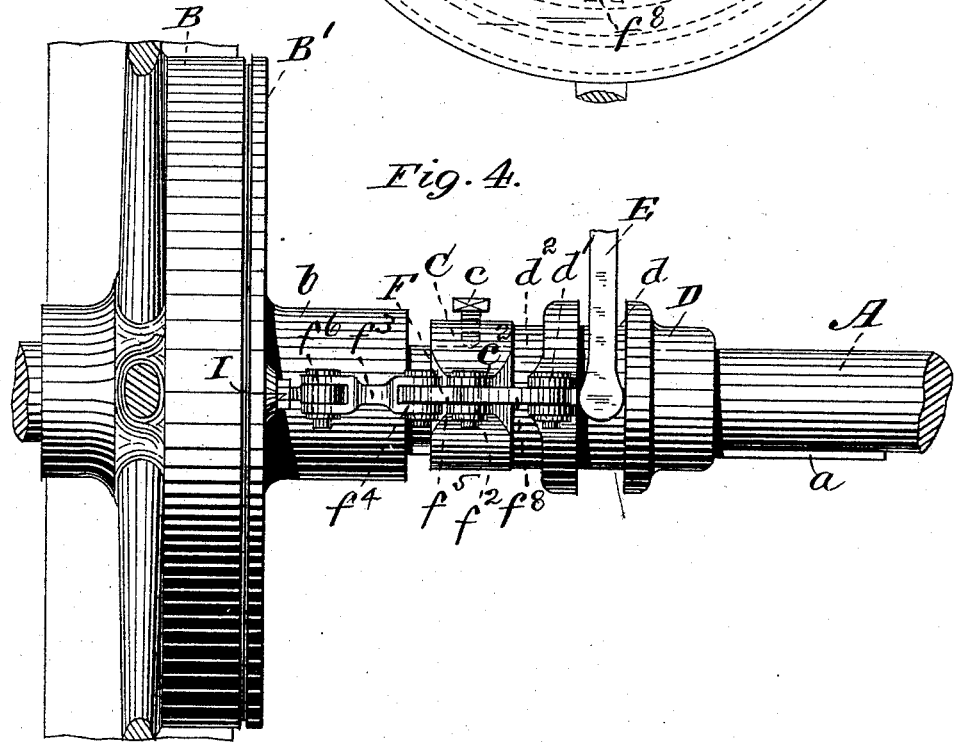
WITNESSES
Edward W. Purrell
A. Bonville
INVENTOR
Milton F. Williams
by C. D. Moody
his atty

UNITED STATES PATENT OFFICE.

MILTON F. WILLIAMS, OF ST. LOUIS, MISSOURI.

CLUTCH.

SPECIFICATION forming part of Letters Patent No. 441,998, dated December 2, 1890.

Application filed September 18, 1890. Serial No. 365,374. (No model.)

*To all whom it may concern:*

Be it known that I, MILTON F. WILLIAMS, of St. Louis, Missouri, have made a new and useful Improvement in Clutches, of which the following is a full, clear, and exact description.

The improvement is adapted more especially, but not exclusively, to what are termed "friction-clutches."

It consists in the means for operating the movable one of the clutch parts, substantially as is hereinafter set forth and claimed, aided by the annexed drawings, making part of this specification, in which—

Figure 1 is a view, partly in side elevation and partly in section, of a clutch in which the improvement under consideration is embodied. The parts are arranged as when the clutch parts are in engagement. Fig. 2 is a view similar to that of Fig. 1, but showing the parts as when the clutch parts are disengaged from each other; Fig. 3, a section on the line 3 3 of Fig. 1; Fig. 4, a plan of the improved clutch; and Fig. 5 is a detail in elevation of the notched collar.

The same letters of reference denote the same parts.

A represents a shaft, to which the clutch is applied.

B and B', respectively, represent the fixed and movable clutch parts of a friction-clutch of the ordinary construction, saving as it is modified or supplemented by the present improvement.

C represents a bearing, which is fixed upon the shaft to rotate therewith. It encircles the shaft, and when it is a separate part therefrom it is fixed thereon by means, say, of the set-screw $c$. It at opposite sides thereof is provided with or shaped to form lugs $c'$ $c'$.

D represents a sleeve adapted to be slipped longitudinally upon the shaft, but adapted by means of the feather $a$ upon the shaft, and with which the sleeve engages, to rotate with the shaft. The sleeve is grooved at $d$ to receive the clutch-lever E, and at opposite sides thereof the clutch is provided with or shaped to form lugs $d'$ $d'$.

A prominent feature of the improvement is a pair of what may be termed "double toggles" F F. They serve to unite the movable clutch part B', the bearing C, and the sleeve D, and by means of them the motion of the sleeve D when that part is slipped upon the shaft is communicated to the movable clutch part to effect its engagement with or to disengage it from the fixed clutch part, as desired.

In effecting the engagement of the parts of a clutch, and especially of a friction-clutch, it is important that the movable clutch part shall not only be properly moved into position, but also be firmly held in position as long as it is desired to use the clutch, and to insure this is one of the objects of the present improvement, and it is accomplished as follows: Each double toggle combines in its construction a bell-crank lever $f'$, which is jointed at $f^2$ to a lug $c'$, a link $f^3$, which at one end $f^4$ is jointed to the arm $f^5$ of the bell-crank and at its other end $f^6$ to a bolt I, which is screwed into the movable clutch part, and another link $f^7$, which at one end is jointed to the arm $f^8$ of the bell-crank and at the other end to a lug $d'$ upon the sleeve D. The various enumerated parts are also so relatively arranged and proportioned, substantially as shown, to enable them when the clutch parts are in engagement, as in Fig. 1, to assume the following position: The link-joints $f^6$ $f^4$ and the bell-crank joint $f^2$ are in line with each other, and at the same time the bell-crank arm $f^8$ overhangs the sleeve D, and the link $f^7$ is at right angles to the sleeve D. With the parts thus arranged a perfect lock is obtained. The link $f^3$ cannot by reason of any reactionary force proceeding from the movable clutch part be dislodged either inwardly or outwardly from its position, for so long as the link $f^7$ remains in its described position the bell-crank $f'$ cannot turn upon its pivot, and owing to the link $f^7$ being directly at right angles to the sleeve and shaft, as described, no force reacting through the bell-crank can displace it. To enable the sleeve D to be readily and accurately adjusted upon the shaft, so that the toggles shall in effecting the engagement of the clutch parts assume the described position, the bearing C and sleeve D are relatively constructed and arranged to cause the sleeve to encounter the bearing when it has been slipped upon the shaft far enough to adjust the toggles. This is accomplished, preferably, by extending the sleeve at $d^2$, and when the sleeve is moved to effect the engagement of the clutch parts the bearing C acts as a stop to the sleeve-extension. In moving the parts in the opposite direction to effect the disengagement of the clutch parts the movable clutch part and the bearing C are relatively constructed and arranged to enable the bearing C to serve as a stop in that direction also, so that the outer portion of the toggles—namely, the bell-crank arm $f^8$ and the link $f^7$—shall not quite assume a straight position, but leave that portion of the mechanism in position to be acted upon when it is desired to slip the sleeve to again effect the engagement of the clutch parts. This is best accomplished by extending the hub $b'$ of the movable clutch part outward sufficiently to cause it to encounter the bearing C before the joint uniting the parts $f^8$ and $f^7$ comes into line with the joints $f^2$ and $d'$. This position is illustrated in Fig. 2.

An additional feature of the construction is a collar G encircling the shaft and notched to fit into the inner end $a'$ of the feather $a$.

This collar acts as a stop to prevent the clutch part B from following the other clutch parts along the shaft when the clutch parts are disengaged. The clutch part B is recessed at $b^2$ to receive the collar. The clutch part B may be connected in any suitable manner with a pulley or other part to be rotated with said clutch part; or, again, the movable clutch part B' may be a pulley or part provided with a clutch part adapted to engage with a complemental clutch part.

I claim—

1. In a clutch, the combination of the shaft, the clutch parts, the bearing fast upon the shaft, the shiftable sleeve, and the double toggles, the outer portion of said toggles having a jointed connection with said sleeve, substantially as described.

2. The combination of the shaft, the clutch parts, the bearing fast upon the shaft, the double toggles, and the shiftable sleeve having the extension to encounter said bearing in effecting the engagement of the clutch parts, substantially as described.

3. The combination of the shaft, the clutch parts, the bearing fast upon the shaft, the shiftable sleeve, and the double toggles, the hub of the movable clutch part being extended to encounter said bearing in the disengagement of the clutch parts, substantially as described.

4. The combination of the shaft, the clutch parts, the bearing fast on the shaft, the shiftable sleeve, and the double toggles, said sleeve being extended inwardly, and the hub of the movable clutch parts being extended outwardly to encounter said bearing, substantially as described.

5. The combination, in a friction-clutch, of the shaft, the clutch parts, and the collar G, said collar encircling said shaft and notched to pass onto the end of the feather of the shaft, and the clutch part B being recessed to receive said collar, substantially as described.

Witness my hand this 13th day of September, 1890.

MILTON F. WILLIAMS.

Witnesses:
C. D. MOODY,
A. BONVILLE.